US011283847B2

(12) United States Patent
Lohmar et al.

(10) Patent No.: US 11,283,847 B2
(45) Date of Patent: Mar. 22, 2022

(54) HANDLING OF CONTENT DELIVERY IN A CLIENT NODE

(71) Applicant: Telefonaktiebolaget LM Ericsson (publ), Stockholm (SE)

(72) Inventors: Thorsten Lohmar, Aachen (DE); Bastian Cellarius, Aachen (DE); Michael John Slssingar, Waterlooville (GB); Eric Turcotte, Montreal (CA)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 458 days.

(21) Appl. No.: 15/775,546

(22) PCT Filed: Dec. 18, 2015

(86) PCT No.: PCT/EP2015/080429
§ 371 (c)(1),
(2) Date: May 11, 2018

(87) PCT Pub. No.: WO2017/102021
PCT Pub. Date: Jun. 22, 2017

(65) Prior Publication Data
US 2018/0332089 A1 Nov. 15, 2018

(51) Int. Cl.
*G06F 15/16* (2006.01)
*H04L 65/611* (2022.01)
(Continued)

(52) U.S. Cl.
CPC ...... *H04L 65/4076* (2013.01); *H04L 63/0428* (2013.01); *H04L 65/105* (2013.01); *H04L 65/4092* (2013.01); *H04L 65/4084* (2013.01)

(58) Field of Classification Search
CPC ............. H04L 65/4076; H04L 63/0428; H04L 65/4084; H04L 65/105; H04L 65/4092
(Continued)

(56) References Cited

U.S. PATENT DOCUMENTS 10,902,474 B2 * 1/2021 Lo ...................... G06Q 30/0269
2011/0064219 A1 * 3/2011 Edlund .............. H04N 7/17318
380/211
(Continued)

FOREIGN PATENT DOCUMENTS

EP 2903310 A1 8/2015
WO 2013182247 A1 12/2013

OTHER PUBLICATIONS

L. Bellido, C. M. Lentisco, M. Aguayo and E. Pastor, "Supporting Handover between LTE Video Broadcasting and Unicast Streaming," 2015 9th International Conference on Next Generation Mobile Applications, Services and Technologies, 2015, pp. 329-334 (Year: 2015).*

(Continued)

Primary Examiner — Taylor A Elfervig
(74) Attorney, Agent, or Firm — Coats + Bennett, PLLC

(57) ABSTRACT

There is provided mechanisms for handling content delivery in a client node. A method being performed by the client node. The method comprises registering, by an application entity of the client node and with an MBMS entity of the client node, for enabling the client node to receive content delivered by encrypted unicast transmission and to receive the content delivered by broadcast transmission. The method comprises selectively controlling, by a trusted entity of the client node, reception of the content in a media player of the client node between reception of the encrypted unicast transmission and broadcast transmission depending on whether the content is available or not for reception on the broadcast transmission.

20 Claims, 6 Drawing Sheets

(51) Int. Cl.
  *H04L 65/1045* (2022.01)
  *H04L 65/613* (2022.01)
  *H04L 29/06* (2006.01)
  *H04L 65/612* (2022.01)

(58) Field of Classification Search
  USPC .......................................................... 709/224
  See application file for complete search history.

(56) References Cited

U.S. PATENT DOCUMENTS

| | | | | |
|---|---|---|---|---|
| 2011/0128865 | A1* | 6/2011 | Doppler | H04W 76/28 |
| | | | | 370/252 |
| 2013/0007814 | A1* | 1/2013 | Cherian | H04L 65/80 |
| | | | | 725/62 |
| 2014/0095668 | A1* | 4/2014 | Oyman | H04L 5/0035 |
| | | | | 709/219 |
| 2014/0310518 | A1* | 10/2014 | Giladi | H04L 63/0428 |
| | | | | 713/165 |
| 2014/0372624 | A1* | 12/2014 | Wang | H04L 69/18 |
| | | | | 709/231 |
| 2016/0205662 | A1* | 7/2016 | Cormier | H04W 8/245 |
| | | | | 370/312 |
| 2016/0373546 | A1* | 12/2016 | Lotfallah | H04L 67/02 |

OTHER PUBLICATIONS

M. Zafar, N. Baker, M. Fuchs, J. Santos, A. Ikram and S. Sargento, "IMS—MBMS Integration: Functional Analysis & Architectural Design," 2007 16th IST Mobile and Wireless Communications Summit, 2007, pp. 1-5 (Year: 2007).*

Yuheng Qiu, U. Horn, T. Rusert and M. Kampmann, "Fast channel switching for hybrid unicast/broadcast Mobile television," 2008 IEEE International Symposium on Broadband Multimedia Systems and Broadcasting, 2008, pp. 1-4 (Year: 2008).*

T. Stockhammer and M. G. Luby, "Dash in mobile networks and services," 2012 Visual Communications and Image Processing, 2012, pp. 1-6 (Year: 2012).*

Stockhammer, T., "3GPP Content Delivery Efforts", Aug. 31, 2015, pp. 1-14, retrieved from internet: http://dashif.org/wp-content/uploads/2015/08/6e-3GPP-Content.pdf, retrieved on Sep. 9, 2016.

3rd Generation Partnership Project, 3rd Generation Partnership Project; Technical Specification Group Services and System Aspects; Multimedia Broadcast /Multicast Services (MBMS); MBMS Extensions and Profiling (Release 13), Technical Report, 3GPP TR 26.852 V13.0.0, Dec. 1, 2015, pp. 1-56, 3GPP.

* cited by examiner

HANDLING OF CONTENT DELIVERY IN A CLIENT NODE

TECHNICAL FIELD

Embodiments presented herein relate to a system, a client node, a method, a computer program, and a computer program product for handling content delivery in the client node.

BACKGROUND

In communications systems, there may be a challenge to obtain good performance and capacity for a given communications protocol, its parameters and the physical environment in which the communications system is deployed.

For example, concepts such as Long Term Evolution (LTE) Broadcast (also known as eMBMS, where MBMS is short for Multimedia Broadcast Multicast Service) allow service offerings using broadcast only or service offerings which combine unicast and broadcast. Different levels of combinations are possible. In the simplest cases, LTE Broadcast allows associated delivery procedures such as File Repair or Reception reporting using unicast for associated services. More advance offerings allow usage of unicast in case broadcast is not available. For instance, when a device intended to consume a service is outside of broadcast coverage, the device can activate unicast reception for service consumption.

For hybrid service offerings, it is also possible that Broadcast transmission is activated on a need bases. For example, broadcast transmission can be activated when the number of receiving devices has grown sufficiently high to justify broadcast. For example, broadcast transmission can be terminated when the interest for reception of the broadcasted service has dropped below a threshold.

Service And Network assisted DASH operation (SAND; where DASH is short for Dynamic Adaptive Streaming over HTTP, and where HTTP is short for Hypertext Transfer Protocol) allows a DASH network to control, or at least influence, the behavior of the DASH client of a media player of a client node.

FIG. 1 schematically illustrates a communications system 100. The communications system 100 comprises at least one client node 150. The client node comprises a DASH client and is arranged to receive media from a media origin. The communications system 100 comprises an origin server 110 symbolizing the media origin.

The communications system 100 comprises a third party server 120.

The communications system 100 comprises at least one DASH aware network element (DANE) entity 130, which has at least minimum intelligence about DASH; the DANE entity 130 may for instance be aware that the delivered objects of the media are DASH-formatted objects such as the Media Presentation Description (MPD) or DASH segments, and may prioritize, parse, or even modify such objects.

In this context the origin server 110 that serves DASH content may in addition to its primary function also receive metric or status messages from the client node 150, and/or send parameters to other DANE entities and is therefore also considered a DANE element. Similarly, the third-party server 120 that receives metrics messages from the client node 150 and sends SAND messages to the client 150 is considered DANE element. The third-party server 120 is not necessarily on the media delivery path so it does not see the DASH segments. However, as it is assumed to understand the DASH metrics and may produce SAND messages to the client node 150, for example to improve delivery, it is nevertheless considered a DANE element. The origin server 110 as well as the third party server 120 are thus also considered to represent respective DANE entities 110, 120.

The communications system 100 comprises a network element 140. The network element 140 represents a regular network element in the sense that it is DASH unaware and treat DASH delivery objects as any other object, but is present on the path between the origin server 110 and client node 150, e.g. transparent caches.

Media is in FIG. 1 provided along the solid line. Interfaces between the entities 110-150 of the communications system 100 are identified as being of one of the following types:

The interface from DANE entity 110, 120, 130 to client node 150 (dotted lines in FIG. 1): A DANE entity 110, 120, 130 provides Parameters Enhancing Reception (PER) messages.

The interface from client node 150 to DANE entity 110, 120, 130 (dash-dotted lines in FIG. 1): The client 150 provides metric and status messages to a DANE entity 110, 120, 130.

The interface from DANE entity 110, 120, 130 to DANE entity 110, 120, 130 (dashed lines in FIG. 1): A DANE entity 110, 120, 130 provides Parameters Enhancing Delivery (PED) messages to another DANE entity 110, 120, 130.

PER messages can be send in-band with the media stream (i.e. at least traversing the same network elements as the media) or can originate form any third party server 120 outside of the media path (i.e., outside the path defined by the solid line in FIG. 1).

In several cases, the DASH client cannot by itself control the behavior of the media player to be optimal from a network perspective.

DASH is based on the concept that the transport network and HTTP caching network is not aware about the DASH content (in contrast to Real-time Transport Protocol (RTP), where dedicated nodes are required). For example, a standard HTTP server, such as the third party server 120, developed for serving web-sites, can also be used to serve DASH content. The DASH content is treated a regular file by the HTTP server. The DASH client of the client node 150 uses regular HTTP transactions to access the content.

An example architecture 200 of a client node 210 configured for popularity based switching is shown in FIG. 2. The client node 210 can be identical to the client node 150 of FIG. 1.

The client node 210 comprises a radio modem 220 configured to receive service content both via unicast and multicast. The client node 210 is thereby configured to support both unicast and multicast reception. Received service content, in the form of media, is stored in a local server 240. A media player 260, that may comprise a DASH client, is arranged to playout media provided by a HTTP proxy 250. The middleware 230 is configured to control the HTTP proxy 250 to steer the traffic through HTTP redirects (as indicated by the interface between the middleware 230 and the HTTP proxy 250).

Some services, such as Over-The-Top (OTT) services, are beginning to use Transport Layer Security (TLS) protected unicast transmission. When TLS is activated, the middleware 230 cannot interact with the content through HTTP redirect.

One way to handle this issue is based on providing an encryption key server in the operator's network. The key server stores the content provider's private encryption key with a client certificate signed provisioned to identify the operator when asking for the encryption key server. The HTTP proxy 250 of the client node 210 therefore has to be trusted and will need to have access to the public key of the origin server 110. This approach thus requires the HTTP proxy 250 to sign security certificates and to be trusted.

Hence, there is a need for an improved way to handle content delivery in a client node.

SUMMARY

An object of embodiments herein is to provide efficient handling of content delivery in a client node.

According to a first aspect there is presented a communications system for handling content delivery in a client node comprising a trusted entity. The communications system comprises the client node, a content ingest, a unicast content delivery network, and a Broadcast Multicast Service Centre (BM-SC). An application entity of the client node is configured to register with a Multimedia Broadcast Multicast Services (MBMS) entity of the client node, for enabling the client node to receive content delivered by encrypted unicast transmission from the content ingest via the unicast content delivery network and to receive the content delivered by broadcast transmission from the content ingest via the BM-SC. The trusted entity is configured to selectively control reception of the content in a media player of the client node between reception of the encrypted unicast transmission and broadcast transmission depending on whether the content is available or not for reception on the broadcast transmission.

According to a second aspect there is presented a client node for handling content delivery in the client node. The client node comprises processing circuitry implementing a trusted entity, an application entity and an MBMS, entity. The client node is configured to register, by the application entity and with the MBMS entity, for enabling the client node to receive content delivered by encrypted unicast transmission and to receive the content delivered by broadcast transmission. The client node is configured to selectively control, by the trusted entity, reception of the content in a media player of the client node between reception of the encrypted unicast transmission and broadcast transmission depending on whether the content is available or not for reception on the broadcast transmission.

According to a third aspect there is presented a client node for handling content delivery in the client node. The client node comprises an application entity configured to register with an MBMS entity of the client node for enabling the client node to receive content delivered by encrypted unicast transmission and to receive the content delivered by broadcast transmission. The client node comprises a trusted entity configured to selectively control reception of the content in a media player of the client node between reception of the encrypted unicast transmission and broadcast transmission depending on whether the content is available or not for reception on the broadcast transmission.

According to a fourth aspect there is presented a method in a communications system for handling content delivery in a client node. The communications system comprises the client node, a content ingest, a unicast content delivery network, and a Broadcast Multicast Service Centre. The method comprises registering, by an application entity of the client node and with an MBMS entity of the client node, for enabling the client node to receive content delivered by encrypted unicast transmission and to receive the content delivered by broadcast transmission. The method comprises selectively controlling, by a trusted entity of the client node, reception of the content in a media player of the client node between reception of the encrypted unicast transmission and broadcast transmission depending on whether the content is available or not for reception on the broadcast transmission.

According to a fifth aspect there is presented a method for handling content delivery in a client node, the method being performed by the client node. The method comprises registering, by an application entity of the client node and with an MBMS entity of the client node, for enabling the client node to receive content delivered by encrypted unicast transmission and to receive the content delivered by broadcast transmission. The method comprises selectively controlling, by a trusted entity of the client node, reception of the content in a media player of the client node between reception of the encrypted unicast transmission and broadcast transmission depending on whether the content is available or not for reception on the broadcast transmission.

According to a seventh aspect there is presented a computer program for handling content delivery in a client node, the computer program comprising computer code. The computer code which, when run on processing circuitry of the client node, causes the client node to register, by an application entity of the client node and with an MBMS entity of the client node, for enabling the client node to receive content delivered by encrypted unicast transmission and to receive the content delivered by broadcast transmission. The computer code which, when run on processing circuitry of the client node, causes the client node to selectively control, by a trusted entity of the client node, reception of the content in a media player of the client node between reception of the encrypted unicast transmission and broadcast transmission depending on whether the content is available or not for reception on the broadcast transmission.

According to an eight aspect there is presented a computer program product comprising a computer program according to the seventh aspect and a computer readable medium, such as a non-volatile computer readable medium, on which the computer program is stored.

Advantageously this system, these client nodes, this method, this computer program and this computer program product for handling content delivery in a client node provides control of how the client node should receive content which enables efficient handling of content delivery in the client node.

It is to be noted that any feature of the first, second, third, fourth, fifth, sixth, seventh and eight aspects may be applied to any other aspect, wherever appropriate. Likewise, any advantage of the first aspect may equally apply to the second, third, fourth, fifth, sixth, seventh, and/or eight aspect, respectively, and vice versa. Other objectives, features and advantages of the enclosed embodiments will be apparent from the following detailed disclosure, from the attached dependent claims as well as from the drawings.

Generally, all terms used in the claims are to be interpreted according to their ordinary meaning in the technical field, unless explicitly defined otherwise herein. All references to "a/an/the element, apparatus, component, means, step, etc." are to be interpreted openly as referring to at least one instance of the element, apparatus, component, means, step, etc., unless explicitly stated otherwise. The steps of any method disclosed herein do not have to be performed in the exact order disclosed, unless explicitly stated.

BRIEF DESCRIPTION OF THE DRAWINGS

The inventive concept is now described, by way of example, with reference to the accompanying drawings, in which.

DETAILED DESCRIPTION

The inventive concept will now be described more fully hereinafter with reference to the accompanying drawings, in which certain embodiments of the inventive concept are shown. This inventive concept may, however, be embodied in many different forms and should not be construed as limited to the embodiments set forth herein; rather, these embodiments are provided by way of example so that this disclosure will be thorough and complete, and will fully convey the scope of the inventive concept to those skilled in the art. Like numbers refer to like elements throughout the description. Any step or feature illustrated by dashed lines should be regarded as optional.

As noted above, when TLS is activated, the middleware 230 cannot interact with the content through HTTP redirect. This requires the HTTP proxy 250 to sign security certificates and to be trusted. Hence, in the current state of the art there is no practical way to, at a client node 150, 210, realize switching between reception of TLS secured unicast transmission and reception of broadcast transmission. This is because the HTPP proxy 250, from a security point of view, acts as the "man in the middle".

The embodiments disclosed herein therefore relate to handling content delivery in a client node 600a, 600b. In order to obtain adaptive beamforming scanning there is provided a client node 600a, 600b, a method performed by the client node 600a, 600b, a computer program comprising code, for example in the form of a computer program product, that when run on a client node 600a, 600b, causes the client node 600a, 600b to perform the method.

Figure 1:
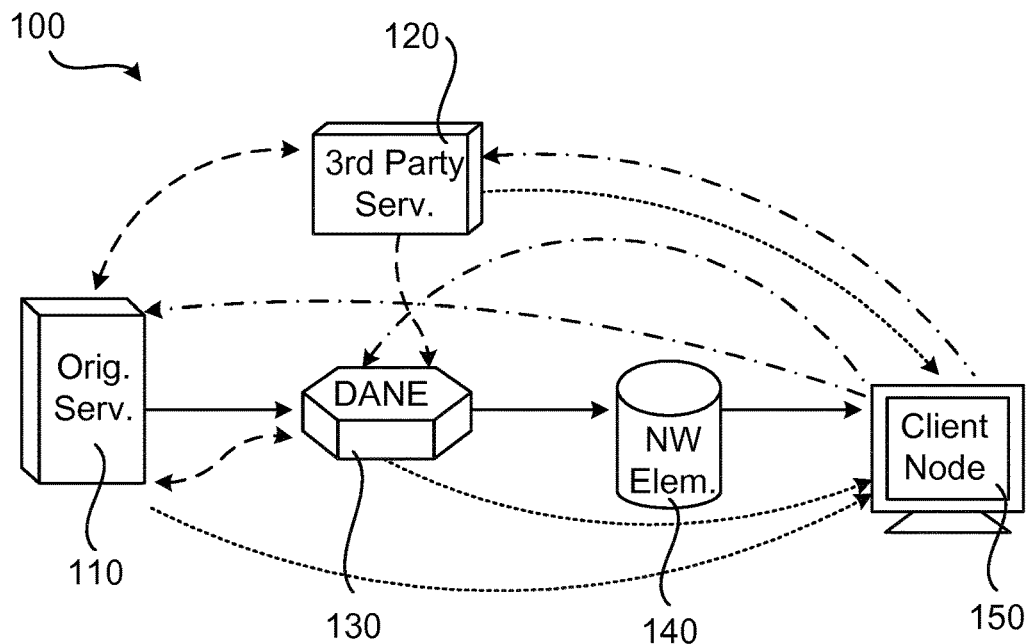
FIG. 1 is a schematic diagram illustrating a communications system according to state of the art.
Figure 2:
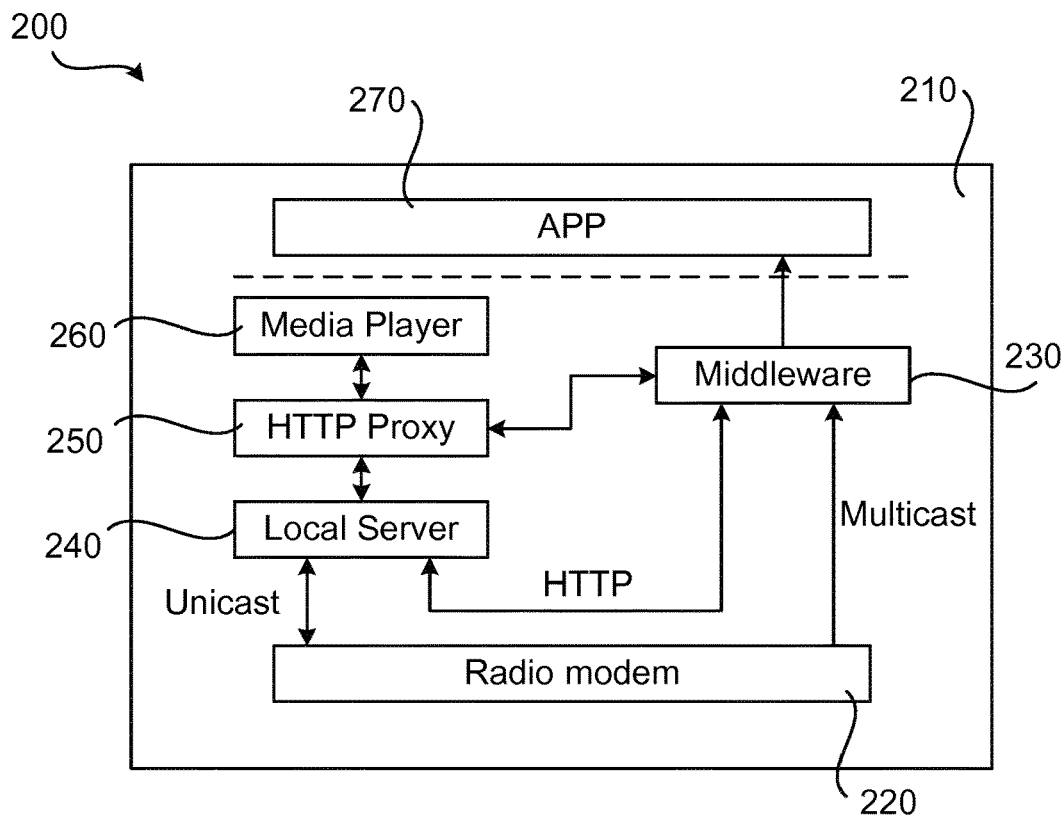
FIG. 2 is a schematic diagram showing building blocks of a network device according to state of the art.
Figure 3:
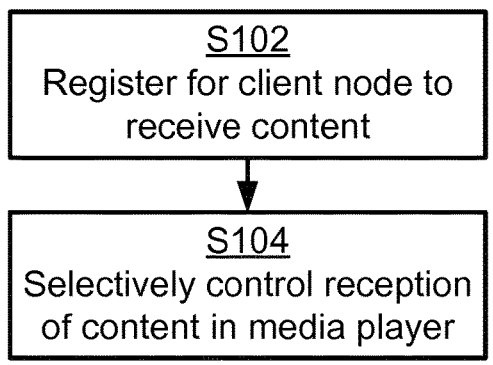
FIGS. 3 and 4 are flowcharts of methods according to embodiments.
Figure 4:
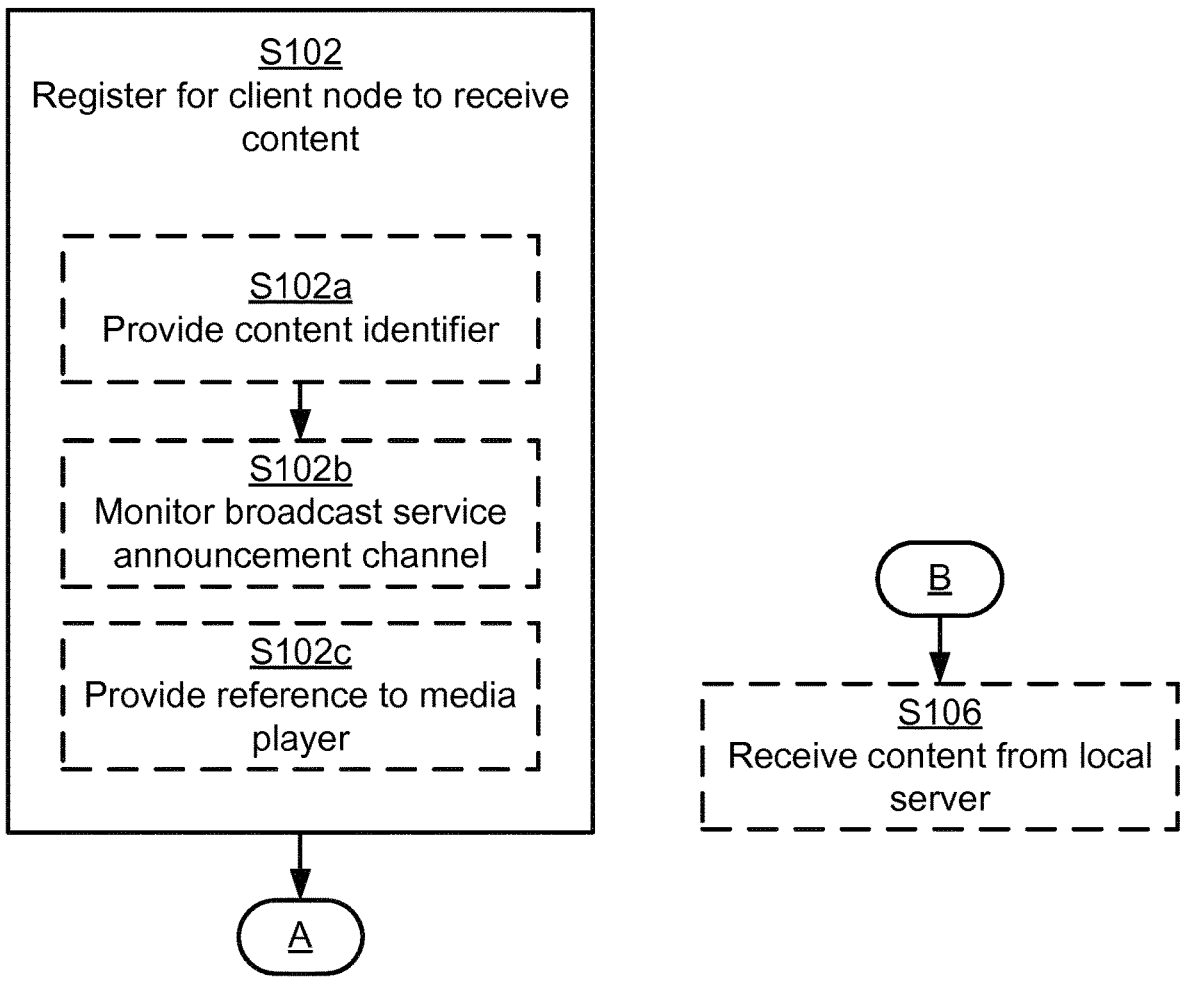
Figure 4:
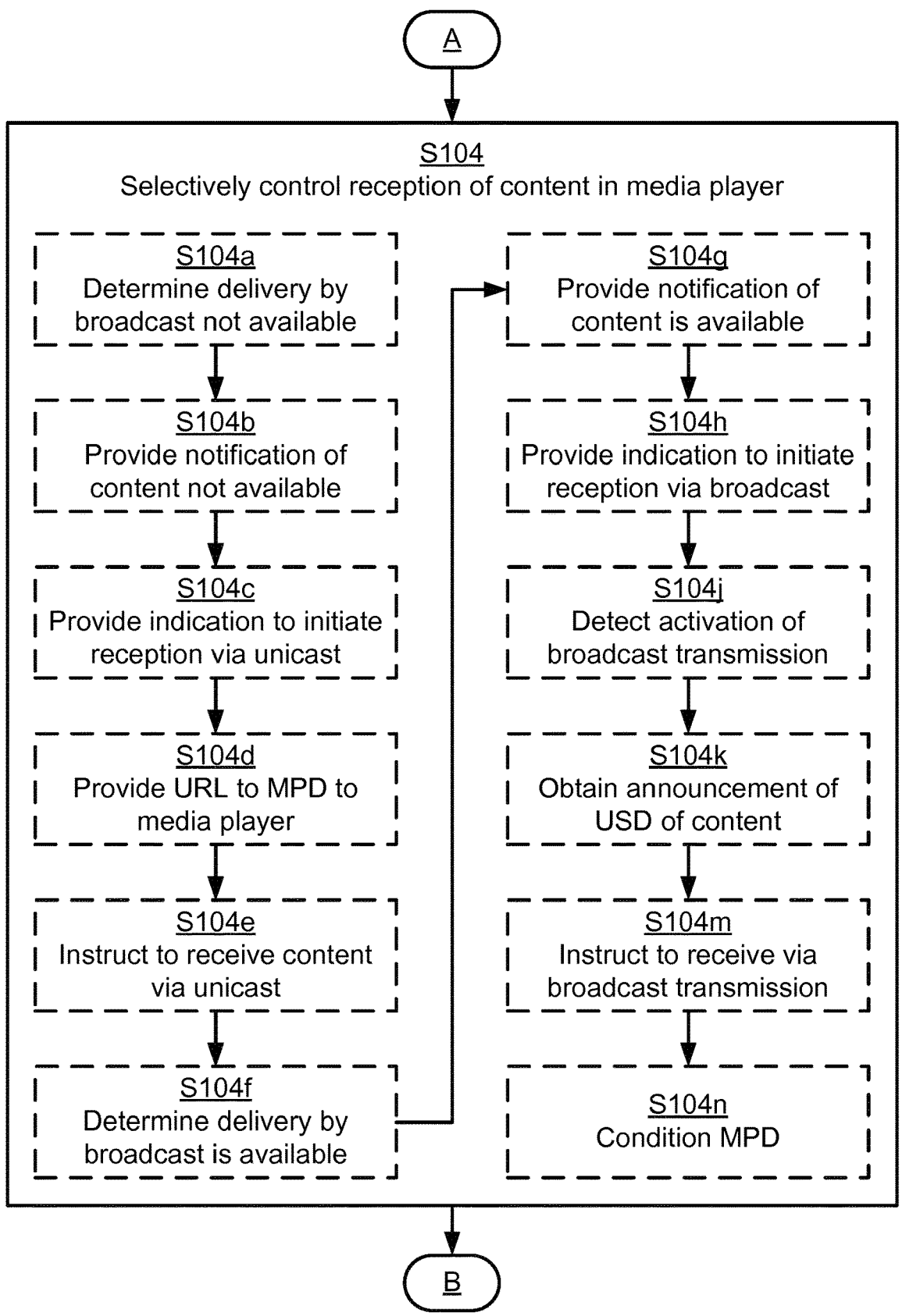

FIGS. 3 and 4 are flow chart illustrating embodiments of methods for handling content delivery in a client node 600a, 600b. The methods are performed by the client node 600a, 600b. The methods are advantageously provided as computer programs 720.

Figure 8:
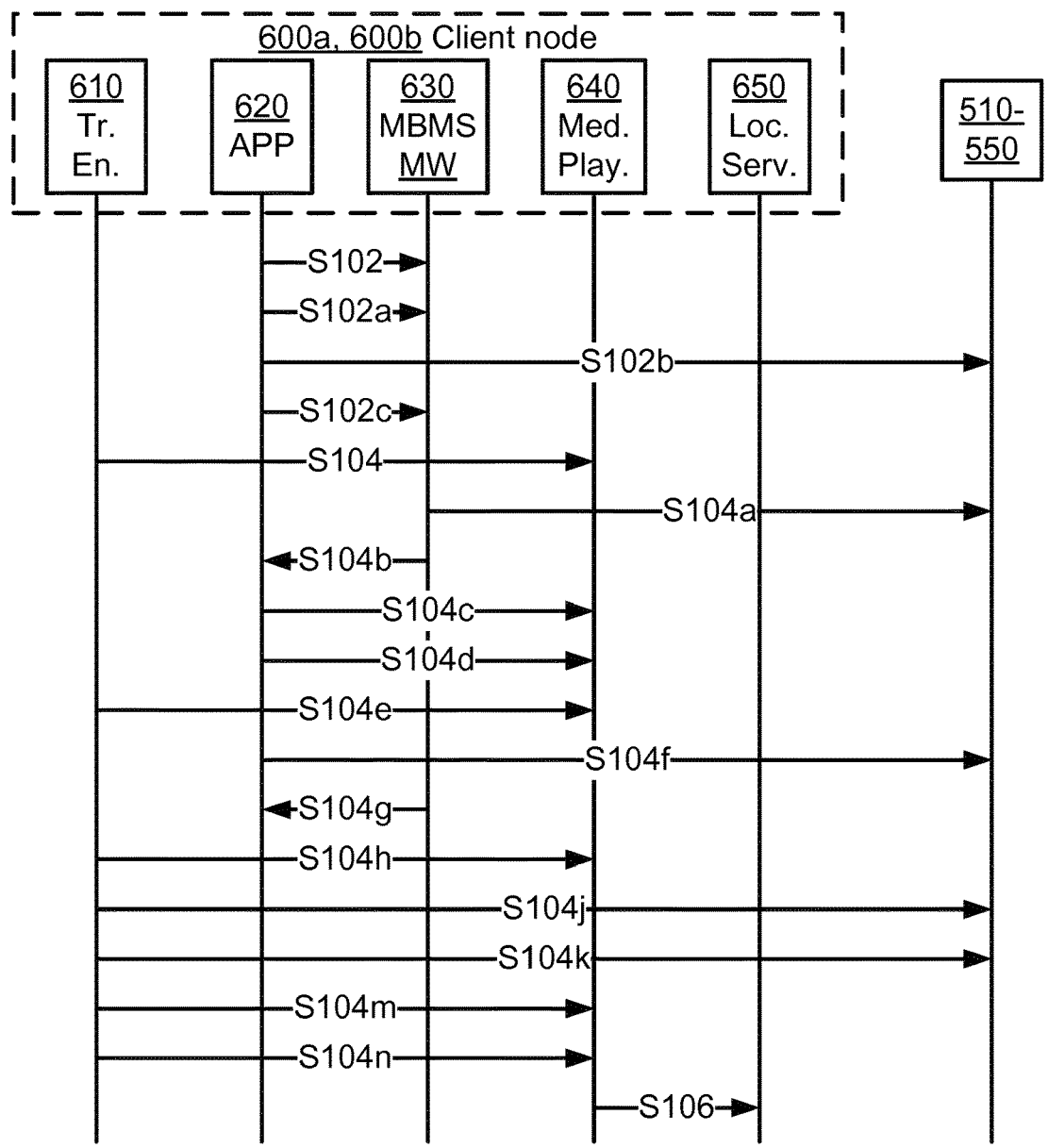
FIG. 8 is a signaling diagram according to an embodiment.

Reference is now made to FIG. 3 illustrating a method for handling content delivery in a client node 600a, 600b as performed by the client node 600a, 600b according to an embodiment. Parallel references are made to the communications systems 500a and 500b of FIGS. 5a and 5b, respectively. Reference is also made to the signaling diagram of FIG. 8.

An application entity 620 of the client node 600a, 600b registers with a Multimedia Broadcast Multicast Services (MBMS) entity 630 of the client node 600a, 600b in order for the client node 600a, 600b to be able to receive content the client node 600a, 600b. Hence, the client node 600a, 600b is configured to perform step S102:

S102: The application entity 620 of the client node 600a, 600b registers with the MBMS entity 630 of the client node 600a, 600b for enabling the client node 600a, 600b to receive content delivered by encrypted unicast transmission and to receive the content delivered by broadcast transmission.

The trusted entity 610, in some aspects, steers the media player 640 from reception of the content via encrypted unicast transmission to reception of the content via broadcast (and vice versa) when the MBMS entity 630 detects identical content of encrypted unicast transmission being available on broadcast transmission. Hence, the client node 600a, 600b is configured to perform step S104:

S104: The trusted entity 610 selectively controls reception of the content in a media player 640 of the client node 600a, 600b between reception of the encrypted unicast transmission and broadcast transmission. Whether to receive the content via encrypted unicast transmission or via broadcast transmission depends on whether the content is available or not for reception on the broadcast transmission.

In this respect the client node 600a, 600b can comprise more than one media player 640 and the application entity 620 can be configured to determine which media player 640 of the client node 600a, 600b to invoke for the content rendering; thus enabling the possibility of multiple device player support. Typically, there can be a native device media player, but Web media players and third part media players can also be provided for accessing media content in the client node 600a, 600b.

This enables efficient switching between reception of the content via unicast and broadcast transmission depending on factors such as mobility coverage or external network popularity heuristics switching on broadcast according to trending content in a geographical area.

Further aspects of handling content delivery in a client node 600a, 600b will now be disclosed.

There are different examples of trusted entities 510. According to an embodiment the trusted entity 610 is a DASH aware network element (DANE) where DASH denotes Dynamic Adaptive Streaming over HTTP, and where HTTP denotes Hypertext Transfer Protocol.

According to an embodiment the media player 640 comprises a DASH client. This enables the media player 640 to receive and to play out DASH content.

There are different ways to encrypt the unicast transmission. According to an embodiment the encrypted unicast transmission is encrypted using a Transport Layer Security (TLS) protocol. This ensures privacy between the communicating applications and their users.

There are different ways to provide the MBMS entity 630. According to an embodiment the MBMS entity 630 is provided by MBMS middleware (MW). This provides efficient implementation of the MBMS entity 630.

Reference is now made to FIG. 4 illustrating methods for handling content delivery in a client node 600a, 600b as performed by the client node 600a, 600b according to further embodiments. It is assumed that steps S102 and S104 are performed as disclosed above. Continued parallel references are made to the communications systems 500a and 500b of FIGS. 5a and 5b, respectively and the signaling diagram of FIG. 8.

There are different ways to provide, and to implement, the trusted entity 610. Two embodiments relating thereto will now be disclosed in detail.

According to some aspects, the application entity 620 can be regarded as implementing a SAND proxy. The application entity 620 can thereby register with the MBMS entity 630 for the desired content, such as "content available on broadcast". Based on such notifications, the application entity 620 can steer the media player 640 (or its DASH client) to consume content either from the encrypted unicast transmission or from the broadcast transmission.

Hence, according to a first embodiment the trusted entity 610 is provided in, or co-located with, the application entity 620. According to this first embodiment the trusted entity 610 can be implemented in the application entity 620.

According to some aspects, the application entity 620 can be regarded as delegating the trust to the MBMS entity 630. Here, the application entity 620 can instantiate and initialize the media player 640 (or its DASH client) and pass a handle (such as a SAND handle) to the media player 640 (or its DASH client) to the MBMS entity 630. The MBMS entity 630 can now steer the media player 640 (or its DASH client) directly. Hence, according to a second embodiment the trusted entity 610 is provided in, or co-located with, the MBMS entity 630. According to this second embodiment the trusted entity 610 can be implemented in the MBMS entity 630.

Details of step S102 will now be disclosed.

There are different ways for the client node 600a, 600b to perform the registration in step S102. For example the application entity 620 can provide a content identifier of the content. Hence, the client node 600a, 600b can be configured to perform step S102a as part of step S102:

S102a: The application entity 620 provides to the MBMS entity 630, a content identifier of the content. In this respect, there are different content identifiers. According to some aspects the content identifier is an MBMS service identity or a unicast Uniform Resource Locator (URL).

The client node 600a, 600b can continuously monitor content availability via broadcast transmission. Hence, the client node 600a, 600b can be configured to perform step S102b after having performed step s102a and as part of step S102:

S102b: The MBMS entity 630 monitors, using the content identifier, a broadcast service announcement channel for the content. Thereby, when the MBMS entity 630 detects previously registered content available for reception via broadcast transmission, the MBMS entity 630 can notify the application entity 620 or the media player 640 to receive the content from broadcast transmission. This will be further disclosed below in conjunction with details of step S104.

According to another embodiment the client node 600a, 600b is configured to perform step S102c as part of step S102 instead of steps S102a and S102b:

S102c: The application entity 620 provides to the MBMS entity 630, a reference to the media player 640.

Details of step S104 will now be disclosed. As disclosed above, the application entity 620 registers with the MBMS entity 630 to receive the content via unicast transmission. The MBMS entity 630 can then check whether the content is available also via broadcast transmission or not. When the content is not available via broadcast transmission, the MBMS entity 630 can notify the application entity 620, which then starts receiving the content via unicast transmission.

Hence, according to an embodiment (when the content is not available via broadcast transmission) the client node 600a, 600b is configured to selectively controlling reception of the content in the media player 640 by performing steps S104a, S104b, S104c:

S104a: The MBMS entity 630 determines that the content is not available for delivery by broadcast transmission.

As a result thereof steps S104b, S104c are performed:

S104b: The MBMS entity 630 provides to the application entity 620a notification that the content is not available for delivery by broadcast transmission.

S104c: The application entity 620 provides to the media player 640 an indication to initiate reception of the content delivered by the encrypted unicast transmission.

Further, according to an embodiment (when the content is available via broadcast transmission) the client node 600a, 600b is configured to selectively controlling reception of the content in the media player 640 by performing steps S104f, S104g, S104h:

S104f: The MBMS entity 630 determines that the content is available for delivery by broadcast transmission.

As a result thereof steps S104g, S104h are performed:

S104g: The MBMS entity 630 provides to the application entity 620 or to the media player 640 a notification that the content is available for delivery by broadcast transmission. The notification is provided to the application entity 620 if the trusted entity 610 is provided in the application entity 620. The notification is provided to the media player 640 if the trusted entity 610 is provided in the MBMS entity 630.

S104h: The trusted entity 610 provides to the media player 640 an indication to initiate reception of the content delivered by the broadcast transmission.

Further details of step S104 will now be disclosed.

There can be different ways for triggering reception of the content in the media player 640. One example includes the client node 600a, 600b to be configured to perform step S104d:

S104d: The application entity 620 provides to the media player 640 a URL to a Media Presentation Description (MPD) for encrypted unicast transmission of the content. The provision of the URL to the MDP may thus act as a trigger for the media player 640 to receive the content (i.e. for reception of the content in the media player 640).

Further embodiment relating to how the reception of the content in the media player 640 can be selectively controlled by the trusted entity 610 will now be disclosed.

The content is to be received via encrypted unicast transmission when not available on the broadcast transmission. The client node 600a, 600b can therefore be configured to perform step S104e:

S104e: The trusted entity 610 instructs the media player 640 to receive the content on the encrypted unicast transmission when not available on the broadcast transmission.

The client node 600a, 600b detects activation of a broadcast transmission of the content. The client node 600a, 600b can therefore be configured to perform step S104j:

S104j: The trusted entity 610 detects activation of a broadcast transmission of the content.

There can be different ways to detect activation of the broadcast transmission of the content. According to some aspects activation is detected via an announcement of a User Service Description. The client node 600a, 600b can therefore be configured to perform step S104k:

S104k: The trusted entity 610 obtains an announcement of a User Service Description of the content on a broadcast service announcement channel.

Upon having detected activation of the broadcast transmission of the content the client node 600a, 600b can receive the content on the broadcast transmission. The client node 600a, 600b can therefore be configured to perform step S104m:

S104m: The trusted entity 610 instructs the media player 640 to receive the content on the broadcast transmission when available.

Further, the trusted entity 610 can condition an MPD of the content received via broadcast transmission. The client node 600a, 600b can therefore be configured to perform step S104m as part of selectively controlling reception of the content in the media player 640:

S104n: The trusted entity 610 conditions the MPD of the content to make at least one representation of the content un-available to the media player 640 and to provide an Availability Start Time (AST) transport timing offset for compensating for transport delay of the content.

Once the media player 640 has access to all information needed to receive the content the media player 640 can start receiving the content. The content is in the client node 600a, 600b first stored, or buffered, in the local server 650. According to an embodiment the client node 600a, 600b is therefore configured to perform step S106:

S106: The media player 640 receives the content from a local server 650 of the client node 600a, 600b.

Two particular embodiments for handling content delivery in the client node 600a, 600b based on at least some of the above disclosed embodiments will now be disclosed in turn.

Figure 5A:
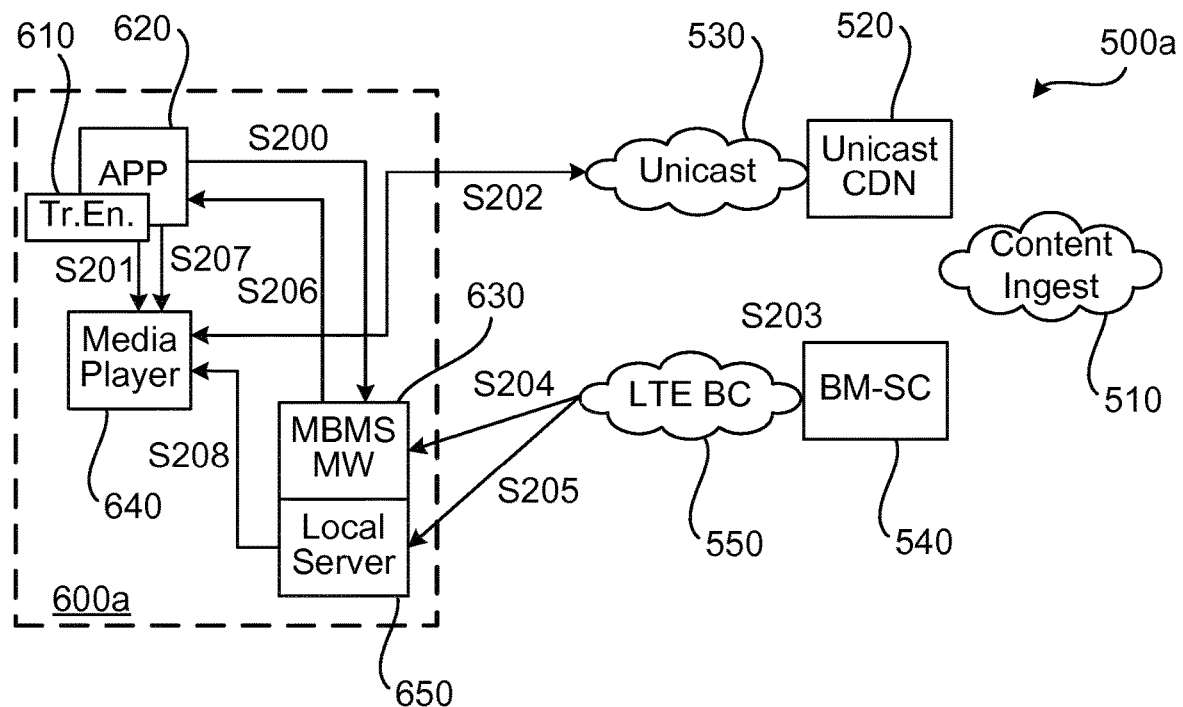
FIGS. 5a and 5b are schematic diagrams illustrating communications systems according to embodiments.

A first particular embodiment for handling content delivery in a client node 600a will now be disclosed with reference the communications system 500a of FIG. 5a.

In this first particular embodiment the trusted entity 610 is provided in, or co-located with, the application entity 620 and hence the MBMS entity 630 is not trusted as DANE. The application entity 620 registers for notifications, e.g. providing a service identity (ID) or providing a unicast MPD URL.

S200: The application (APP) entity 620 registers with the MBMS Middleware (MW) 630 and provides the MBMS entity 630 with a unicast DASH media presentation description (MPD) uniform resource locator (URL) or another content identifier. The MBMS entity 630 uses this content identifier to monitor a broadcast service announcement channel for the content.

S201: The application 620 triggers the DASH client of the media player 640 by providing the unicast MPD URL.

S202: The (DASH client of the) media player 640 starts fetching content from the content ingest 510 via the unicast content delivery network (CDN) 520 via a unicast transmission system 530. The MPD and the content are TLS protected. Play-out of the content thus follows a normal TLS procedure.

S203: The LTE broadcast (BC) transmission system 550 detects trending content and activates broadcast transmission of the content from the content ingest 510 via the Broadcast Multicast Service Centre (BM-SC) 540.

S204: A User Service Description of the content to be broadcasted is announced on the broadcast service announcement channel.

S205: The broadcast of the content is started on the broadcast service announcement channel.

S206: The MBMS entity 630 detects the broadcasted content on the broadcast service announcement channel and notifies the application 620 about the alternative content (meaning the device hosting the client node 600a is in eMBMS coverage). The new MPD location is provided.

S207: The trusted entity 610 of the application entity 620 triggers the media player 640 to fetch the content from the local server 650. A new MPD location is provided in order for the media player 640 to stop updating MPDs over unicast.

S208: The media player 640 starts fetching the content from the local server 650.

Figure 5B:
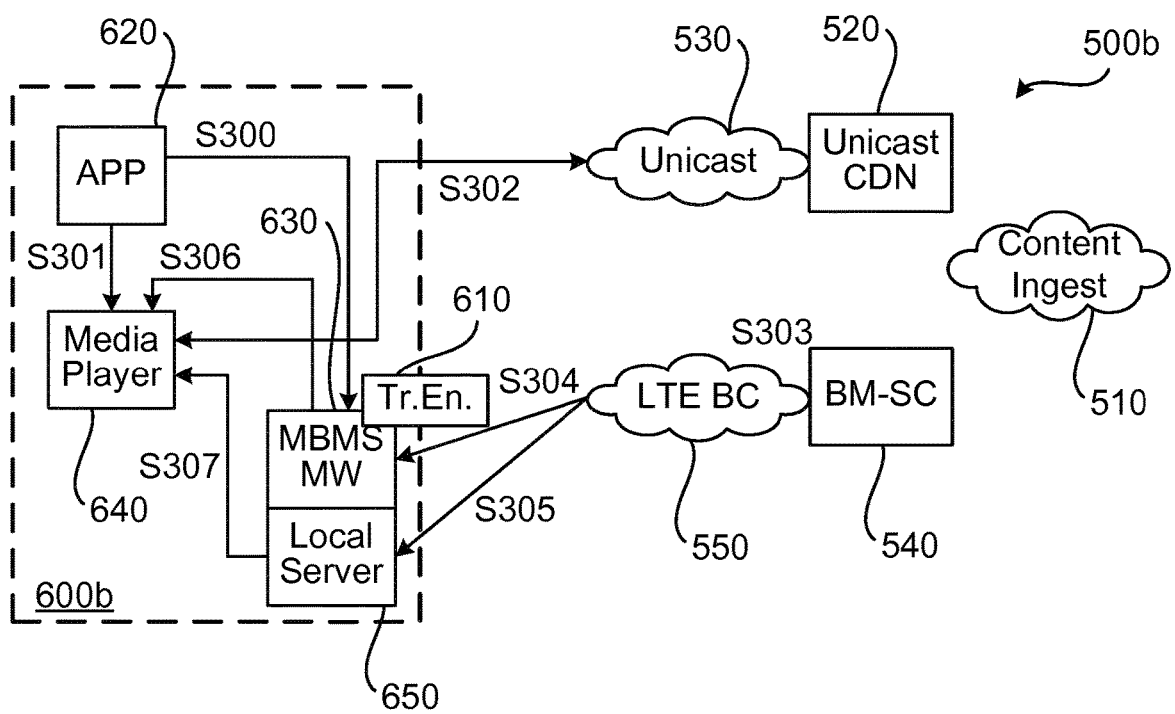

A second particular embodiment for handling content delivery in the client node 600b will now be disclosed with reference the communications system 500b of FIG. 5b.

In this second particular embodiment, the trusted entity 610 is provided in, or co-located with, the MBMS entity 630. Hence, the application entity 620 can delegate the DANE trust relation to the MBMS entity 630 and can give a reference to the media player 640 to the MBMS entity 630.

S300: The application (APP) entity 620 registers with the MBMS entity 630 and provides a reference to the media player 640. Further, the application entity 620 registers the consumed content, e.g. a MBMS service identity or the unicast URL.

S301: The application 620 triggers the DASH client of the media player 640 to start by providing the unicast MPD URL.

S302: The (DASH client of the) media player 640 starts fetching content from the content ingest 510 via the unicast content delivery network (CDN) 520 via a unicast transmission system 530. The MPD and the content are TLS protected. Play-out of the content thus follows a normal TLS procedure.

S303: The LTE broadcast (BC) transmission system 550 detects trending content and activates broadcast transmission of the content from the content ingest 510 via a Broadcast Multicast Service Centre (BM-SC) 540.

S304: A User Service Description of the content to be broadcasted is announced on the broadcast service announcement channel.

S305: The broadcast of the content is started on the broadcast service announcement channel.

S306: The MBMS entity 630 uses the SAND channel and notifies the (DASH client of the) media player 640 that the application entity 620 (meaning the device hosting the client node 600a, 600b is in eMBMS coverage). The MBMS entity 630 gives a new MPD location and (conditions the MPD) in this case making at least one representation of the content un-available to the media player 640. The conditioning also provides an Availability Start Time (AST) offset which is used to compensate or adjust for the eMBMS transport delay.

S307: The media player 640 starts fetching the content from the local server 650.

Figure 6A:
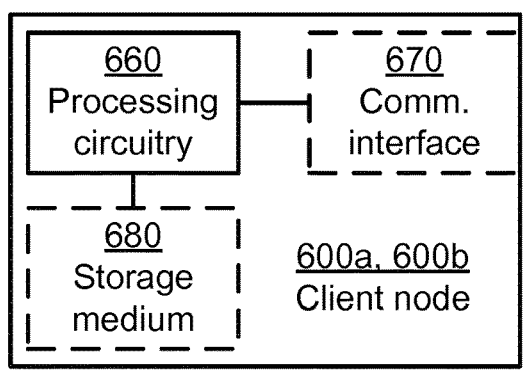
FIG. 6a is a schematic diagram showing functional units of a network device according to an embodiment.

FIG. 6a schematically illustrates, in terms of a number of functional units, the components of a client node 600a, 600b according to an embodiment. Processing circuitry 660 is provided using any combination of one or more of a suitable central processing unit (CPU), multiprocessor, microcontroller, digital signal processor (DSP), application specific integrated circuit (ASIC), field programmable gate arrays (FPGA) etc., capable of executing software instructions stored in a computer program product 710 (as in FIG. 7), e.g. in the form of a storage medium 680.

Particularly, the processing circuitry 660 is configured to cause the client node 600a, 600b to perform a set of operations, or steps, S102-S106, S200-S208, S300-S307, as disclosed above. For example, the storage medium 680 may store the set of operations, and the processing circuitry 660 may be configured to retrieve the set of operations from the storage medium 680 to cause the client node 600a, 600b to perform the set of operations. The set of operations may be provided as a set of executable instructions.

Thus the processing circuitry 660 is thereby arranged to execute methods as herein disclosed. The storage medium 680 may also comprise persistent storage, which, for example, can be any single one or combination of magnetic memory, optical memory, solid state memory or even remotely mounted memory. The client node 600a, 600b may further comprise a communications interface 670 for communications with at least a unicast transmission system 530 and a broadcast transmission system 550. As such the communications interface 670 may comprise one or more transmitters and receivers, comprising analogue and digital components. The processing circuitry 660 controls the general operation of the client node 600a, 600b e.g. by sending data and control signals to the communications interface 670 and the storage medium 680, by receiving data and reports from the communications interface 670, and by retrieving data and instructions from the storage medium 680. Other components, as well as the related functionality, of the client node 600a, 600b are omitted in order not to obscure the concepts presented herein.

Figure 6B:
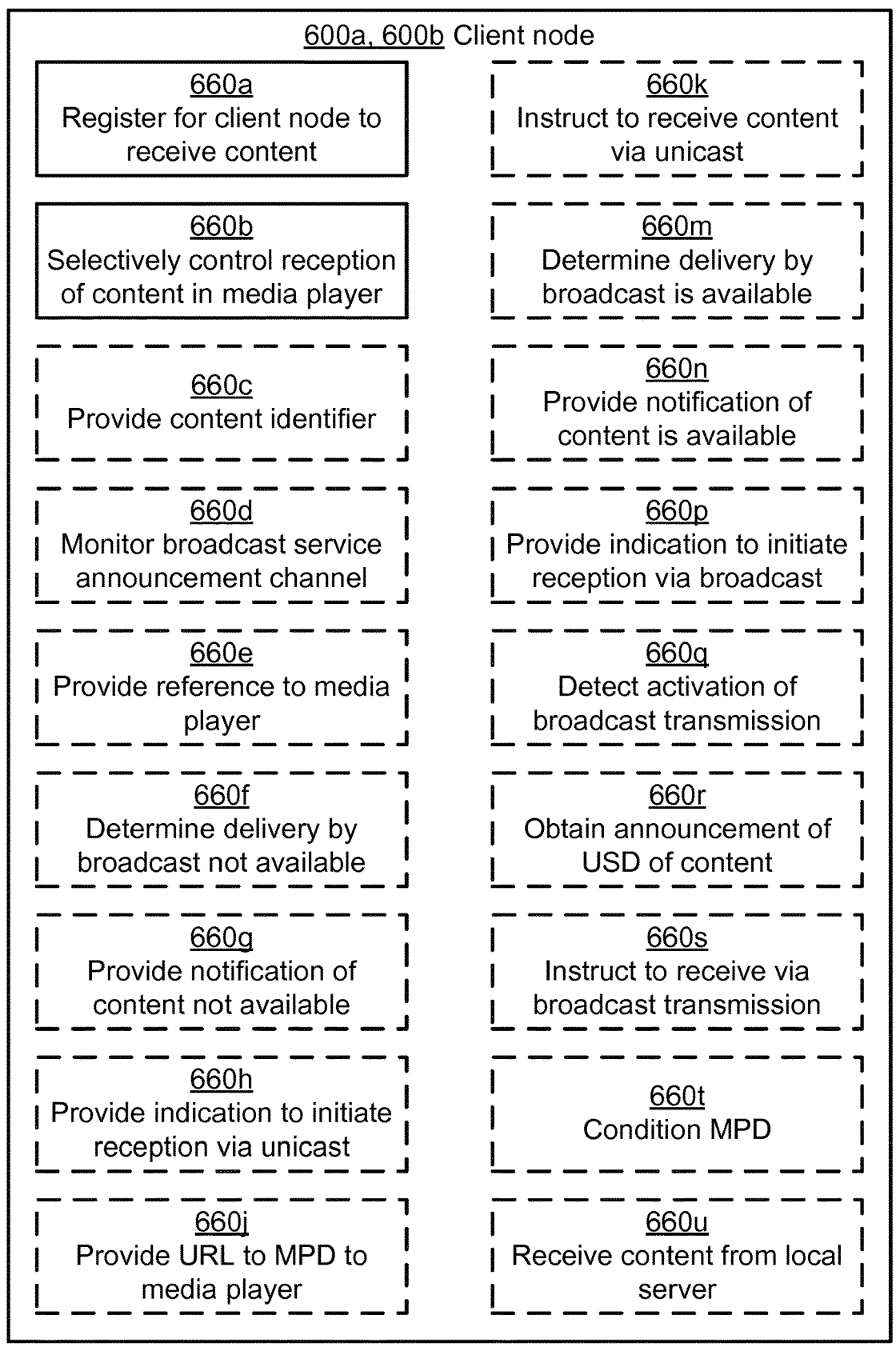
FIG. 6b is a schematic diagram showing functional modules of a network device according to an embodiment.

FIG. 6b schematically illustrates, in terms of a number of functional modules, the components of a client node 600a, 600b according to an embodiment. The client node 600a, 600b of FIG. 6b comprises a number of functional modules:

a register for client node to receive content module 660a for registering for a client node to receive content and thus configured to perform step S102; and a selectively control reception of content in media player module 660b for selectively control reception of content in the media player and thus configured to perform step S104.

The client node 600a, 600b of FIG. 6b may further comprises a number of optional functional modules, such as any of:

a provide content identifier module 660c for providing content identifier and thus configured to perform step S102a;

a monitor broadcast service announcement channel module 660d for monitoring a broadcast service announcement channel and thus configured to perform step S102b;

a provide reference to media player module 660e for providing a reference to the media player and thus configured to perform step S102c;

a determine delivery by broadcast not available module 660f for determining delivery by broadcast not available and thus configured to perform step S104a;

a provide notification of content not available module 660g for providing a notification of content not available and thus configured to perform step S104b;

a provide indication to initiate reception via unicast module 660h for providing an indication to initiate reception via unicast and thus configured to perform step S104c;

a provide URL to MPD to media player module 660j for providing a URL to an MPD to a media player and thus configured to perform step S104d;

an instruct to receive content via unicast module 660k for instructing to receive content via unicast and thus configured to perform step S104e;

a determine delivery by broadcast is available module 660m for determining that delivery by broadcast is available and thus configured to perform step S104f;

a provide notification of content is available module 660n for providing a notification that content is available and thus configured to perform step S104g;

a provide indication to initiate reception via broadcast module 660p for providing an indication to initiate reception via broadcast and thus configured to perform step S104h;

a detect activation of broadcast transmission module 660q for detecting activation of broadcast transmission and thus configured to perform step S104j;

an obtain announcement of USD of content module 660r for obtaining an announcement of USD of content and thus configured to perform step S104k;

an instruct to receive via broadcast transmission module 660s for instructing to receive via broadcast transmission and thus configured to perform step S104m;

a condition MPD module 660t for conditioning MPD and thus configured to perform step S104n; and a receive content from local server module 660u for receiving content from a local server and thus configured to perform step S106.

In general terms, each functional module 660a-660u may in one embodiment be implemented only in hardware or and in another embodiment with the help of software, i.e., the latter embodiment having computer program instructions stored on the storage medium 680 which when run on the processing circuitry 660 makes the client node 600a, 600b perform the corresponding steps mentioned above in conjunction with FIGS. 3, 4, 5a, and 5b. For a hardware implementation the functional modules 660a-660u may be implemented in the processing circuitry 660, possibly also in the communications interface 670 and the storage medium 680. It should also be mentioned that even though the modules correspond to parts of a computer program, they do not need to be separate modules therein, but the way in which they are implemented in software is dependent on the programming language used. Preferably, one or more or all functional modules 660a-660u may be implemented by the processing circuitry 660, possibly in cooperation with functional units 670 and/or 680. The processing circuitry 660 may thus be configured to from the storage medium 680 fetch instructions as provided by a functional module 660a-660u and to execute these instructions, thereby performing any steps as herein disclosed.

Hence, in comparison to FIG. 6a, FIG. 6b provides a functional oriented description of the client node 600a, 600b whereas FIG. 6a provides a building block oriented view of the client node 600a, 600b. The building blocks (i.e., the processing circuitry 660, the communications interface 670, and the storage medium 680) of the client node 600a, 600b in FIG. 6a may be configured to perform the functionality defined by the functional modules 660a-660u of the client node 600a, 600b in FIG. 6b.

The client node 600a, 600b can be part of the communications system 500a, 500b. Particularly, the communications system 500a, 500b for handling content delivery in the client node 600a, 600b can, in addition to at least one client node 600a, 600b, comprise the content ingest 510, the unicast content delivery network 520, and the BM-SC 540.

The client node 600a, 600b can be hosted by a device such as an end-user device. Examples of such devices are wireless devices, user equipment, smartphones, tablet computers, laptop computers, etc.

Figure 7:
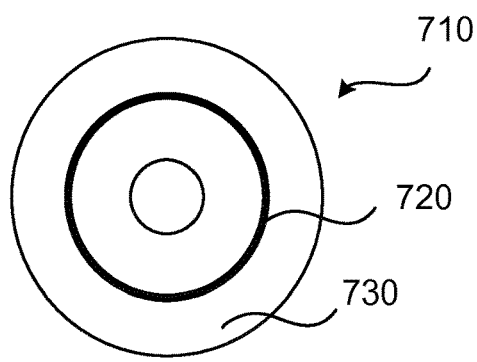
FIG. 7 shows one example of a computer program product comprising computer readable means according to an embodiment.

FIG. 7 shows one example of a computer program product 710 comprising computer readable means 730. On this computer readable means 730, a computer program 720 can be stored, which computer program 720 can cause the processing circuitry 660 and thereto operatively coupled entities and devices, such as the communications interface 670 and the storage medium 680, to execute methods according to embodiments described herein. The computer program 720 and/or computer program product 710 may thus provide means for performing any steps as herein disclosed.

In the example of FIG. 7, the computer program product 710 is illustrated as an optical disc, such as a CD (compact disc) or a DVD (digital versatile disc) or a Blu-Ray disc. The computer program product 710 could also be embodied as a memory, such as a random access memory (RAM), a read-only memory (ROM), an erasable programmable read-only memory (EPROM), or an electrically erasable programmable read-only memory (EEPROM) and more particularly as a non-volatile storage medium of a device in an external memory such as a USB (Universal Serial Bus) memory or a Flash memory, such as a compact Flash memory. Thus, while the computer program 720 is here schematically shown as a track on the depicted optical disk, the computer program 720 can be stored in any way which is suitable for the computer program product 710.

The inventive concept has mainly been described above with reference to a few embodiments. However, as is readily appreciated by a person skilled in the art, other embodiments than the ones disclosed above are equally possible within the scope of the inventive concept, as defined by the appended patent claims.

The invention claimed is:

1. A communications system for handling content delivery in a client node, the communications system comprising:
a content ingest;
a unicast content delivery network,
a Broadcast Multicast Service Center (BM-SC); and
the client node comprising:
processing circuitry; and
memory comprising instructions executable by the processing circuitry, wherein the instructions are such that the client node is operative to:
cause an application entity on the client node to register with a Multimedia Broadcast Multicast Services (MBMS) entity on the client node for enabling the client node to receive content delivered by encrypted unicast transmission from the content ingest via the unicast content delivery network, and to receive the content delivered by broadcast transmission from the content ingest via the BM-SC; and
cause a trusted entity in the client node to selectively control reception of the content in a media player of the client node between reception of the encrypted unicast transmission and broadcast transmission depending on whether the content is available or not for reception on the broadcast transmission.

2. A client node for handling content delivery in the client node, the client node comprising:
processing circuitry;
memory containing instructions executable by the processing circuitry whereby the processing circuitry is operative to implement a trusted entity, an application entity, and a Multimedia Broadcast Multicast Services (MBMS) entity;
wherein the instructions are such that the client node is operative to:
register, by the application entity and with the MBMS entity, for enabling the client node to receive content delivered by encrypted unicast transmission and to receive the content delivered by broadcast transmission; and
selectively control, by the trusted entity, reception of the content in a media player on the client node between reception of the encrypted unicast transmission and broadcast transmission depending on whether the content is available or not for reception on the broadcast transmission.

3. The client node of claim 2, wherein the trusted entity is:
provided in, or co-located with, the application entity; or
provided in, or co-located with, the MBMS entity.

4. The client node of claim 2, wherein the instructions are such that the client node is operative to selectively control reception of the content in the media player by determining, by the MBMS entity, that the content is not available for delivery by broadcast transmission; and
as a result thereof:
provide, by the MBMS entity and to the application entity, a notification that the content is not available for delivery by broadcast transmission; and
provide, by the application entity and to the media player, an indication to initiate reception of the content delivered by the encrypted unicast transmission.

5. The client node of claim 2, wherein the instructions are such that the client node is operative to selectively control reception of the content in the media player by determining, by the MBMS entity, that the content is available for delivery by broadcast transmission; and as a result thereof:
provide, by the MBMS entity and to the application entity or the media player, a notification that the content is available for delivery by broadcast transmission; and
provide, by the trusted entity and to the media player, an indication to initiate reception of the content delivered by the broadcast transmission.

6. The client node of claim 5, wherein the notification is provided to the application entity if the trusted entity is provided in the application entity, and to the media player if the trusted entity is provided in the MBMS entity.

7. The client node of claim 2, wherein the instructions are such that the client node is operative to register with the MBMS entity by:
providing, by the application entity and to the MBMS entity, a content identifier of the content; and
monitoring, by the MBMS entity using the content identifier, a broadcast service announcement channel for the content.

8. The client node of claim 2, wherein the client node is configured to register with the MBMS entity by providing, by the application entity and to the MBMS entity, a reference to the media player.

9. The client node of claim 2, wherein the instructions are such that the client node is operative to selectively control reception of the content in the media player by instructing, by the trusted entity, the media player to receive the content on the encrypted unicast transmission when not available on the broadcast transmission.

10. The client node of claim 2, wherein the instructions are such that the client node is operative to selectively control reception of the content in the media player by detecting activation of a broadcast transmission of the content.

11. The client node of claim 2, wherein the instructions are such that the client node is operative to selectively control reception of the content in the media player by obtaining an announcement of a User Service Description of the content on a broadcast service announcement channel.

12. The client node of claim 2, wherein the instructions are such that the client node is operative to selectively control reception of the content in the media player by instructing, by the trusted entity, the media player to receive the content on the broadcast transmission when available.

13. The client node of claim 2, wherein the instructions are such that the client node is operative to selectively control reception of the content in the media player by conditioning a Media Presentation Description (MPD) of the content to make at least one representation of the content unavailable to the media player and to provide an Availability Start Time (AST) transport timing offset for compensating for transport delay of the content.

14. The client node of claim 2, wherein the instructions are such that the client node is operative to receive, by the media player, the content from a local server of the client node.

15. A method for handling content delivery in a client node, the method comprising the client node:
    registering, by an application entity on the client node and with a Multimedia Broadcast Multicast Services (MBMS) entity on the client node, for enabling the client node to receive content delivered by encrypted unicast transmission and to receive the content delivered by broadcast transmission; and
    selectively controlling, by a trusted entity in the client node, reception of the content in a media player on the client node between reception of the encrypted unicast transmission and broadcast transmission depending on whether the content is available or not for reception on the broadcast transmission.

16. The method of claim 15, wherein selectively controlling reception of the content in the media player comprises determining, by the MBMS entity, that the content is not available for delivery by broadcast transmission; and as a result thereof:
    providing, by the MBMS entity and to the application entity, a notification that the content is not available for delivery by broadcast transmission; and
    providing, by the application entity and to the media player, an indication to initiate reception of the content delivered by the encrypted unicast transmission.

17. The method of claim 15, wherein selectively controlling reception of the content in the media player comprises instructing, by the trusted entity, the media player to receive the content on the encrypted unicast transmission when not available on the broadcast transmission.

18. The method of claim 15, wherein selectively controlling reception of the content in the media player comprises determining, by the MBMS entity, that the content is available for delivery by broadcast transmission; and as a result thereof:
    providing, by the MBMS entity and to the application entity or the media player, a notification that the content is available for delivery by broadcast transmission; and
    providing, by the trusted entity and to the media player, an indication to initiate reception of the content delivered by the broadcast transmission.

19. The method of claim 18, wherein the notification is provided to the application entity if the trusted entity is provided in the application entity, and to the media player if the trusted entity is provided in the MBMS entity.

20. A non-transitory computer readable recording medium storing a computer program product for handling content delivery in a client node, the computer program product comprising software instructions which, when run on processing circuitry of the client node, causes the client node to:
    register, by an application entity on the client node and with a Multimedia Broadcast Multicast Services (MBMS) entity on the client node, for enabling the client node to receive content delivered by encrypted unicast transmission and to receive the content delivered by broadcast transmission; and
    selectively control, by a trusted entity in the client node, reception of the content in a media player on the client node between reception of the encrypted unicast transmission and broadcast transmission depending on whether the content is available or not for reception on the broadcast transmission.

* * * * *